Figure 1:
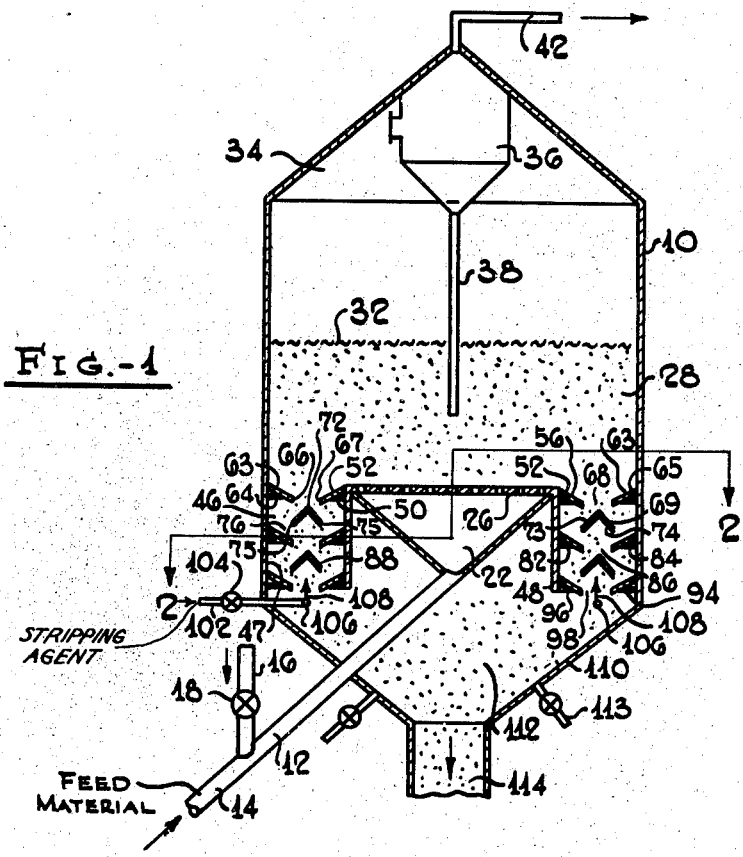

Sept. 21, 1948.  E. J. GOHR ET AL  2,449,601
APPARATUS FOR CONTACTING SOLIDS
AND GASEOUS FLUIDS
Filed Sept. 16, 1944

Edwin J. Gohr
Homer Z. Martin  Inventors
Charles W. Tyson
By _____ Attorney

Patented Sept. 21, 1948

2,449,601

UNITED STATES PATENT OFFICE 2,449,601

APPARATUS FOR CONTACTING SOLIDS AND GASEOUS FLUIDS

Edwin J. Gohr, Summit, Homer Z. Martin, Roselle, and Charles W. Tyson, Summit, N. J., assignors to Standard Oil Development Company, a corporation of Delaware Application September 16, 1944, Serial No. 554,514

2 Claims. (Cl. 23—288)

This invention relates to contacting solid particles in subdivided form with gaseous fluids, and more particularly, relates to the stripping or purging of spent or contaminated catalyst or contact particles following a hydrocarbon catalytic conversion operation.

In the catalytic cracking of hydrocarbons, it is known that coke or carbonaceous material is deposited on the catalyst or contact particles and the particles must be regenerated as by burning with air or other oxygen-containing gas to burn off coke or carbonaceous material from the solid particles before they are used in another catalytic conversion step. The spent or contaminated catalyst or contact particles withdrawn from a reaction zone or vessel entrain hydrocarbon vapors or gases and also contain adsorbed hydrocarbon vapors or gases.

In the first catalytic cracking units built using powdered catalyst or contact material, the reaction products in vapor form and the spent or contaminated catalyst particles are passed overhead from the reaction zone or vessel as a relatively dilute suspension after which the reaction products in vaporous form are separated from dry spent or contaminated catalyst or contact particles. In such an operation stripping of the spent or contaminated catalyst particles is not an especially troublesome problem. In the improved catalytic cracking units the spent or contaminated catalyst particles are withdrawn from the bottom portion of the reaction zone or vessel in a relatively dense dry fluidized liquid-simulating condition and the spent or contaminated catalyst is stripped or purged in the dense phase.

In the improved catalytic cracking units incomplete stripping or purging has been obtained and as a result, more combustible material is fed to the regeneration zone or vessel. This results in a higher loss of feed stock because some recoverable hydrocarbon material is burned in the regeneration zone or vessel and in addition, more heat is produced in the regeneration zone or vessel than is required for the desired extent of conversion.

According to the present invention, the spent or contaminated catalyst or contact particles are withdrawn from the bottom portion of the reaction vessel or zone in a dense fluidized dry liquid-simulating condition and are flowed into an annular stripping zone or section below the reaction vessel, the stripping zone or section being provided with baffle means functioning like a disc and doughnut construction to increase the stripping efficiency. Because the stripping chamber is annular, the baffle means are not of the true disc and doughnut type but a vertical section through the stripping chamber shows the baffle means as simulating a disc and doughnut construction. With this baffle construction, agitation and mixing of the catalyst or contact particles and stripping or purging gas are increased and localized points of high velocity are obtained. Other baffle constructions obtaining similar results may be used.

Figure 2:
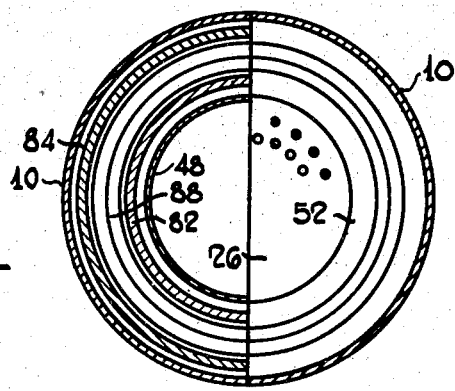

In the drawing:

Fig. 1 represents a vertical longitudinal cross-section taken through one form of apparatus which may be used in practicing this invention; and Fig. 2 represents a horizontal transverse cross-section taken substantially on line 2—2 of Fig. 1.

Referring now to the drawing, the reference character 10 designates a cylindrical vessel provided with an inlet 12 for introducing gaseous fluid or a mixture of gaseous fluid and catalyst or contact particles in subdivided form. Preferably the material to be treated is passed through line 14 and is mixed with hot catalyst or contact particles introduced into line 12 from standpipe 16 provided with a control valve 18. Only a portion of standpipe 16 is shown in the drawing. A sufficient length of standpipe is used to produce a hydrostatic pressure at the base of the standpipe of at least sufficient magnitude to introduce contact particles into line 12.

Where the material to be treated is in liquid form, it is partly preheated and then completely vaporized and raised to reaction temperature by mixing it with a sufficient amount of hot catalyst or contact particles from standpipe 16. The mixture of gaseous fluid and solid particles is passed through line 12 and into a cone 22 arranged in the lower portion of the reaction vessel 10 and provided with a horizontally arranged distribution plate 26 whereby solids and gaseous fluid are evenly distributed across the area of the reaction vessel 10. The distribution plate 26 is circular and has a smaller diameter than the vessel to form a stripping zone around the plate 26 as will be hereinafter described.

The velocity of the gaseous fluid is selected to maintain the solid particles in a dry dense fluidized liquid-simulating condition as shown at 28 in the reaction vessel 10 and having a level indicated at 32. The particles are maintained in a turbulent condition and exceedingly good mixing and agitation are obtained during the reaction or contacting step.

In the catalytic cracking of hydrocarbons, the gaseous fluid passing through line 12 may comprise gas oil and vapors or other hydrocarbon vapors which are to be converted or cracked. Instead of using vapors, hot regenerated catalyst from standpipe 16 may be mixed with liquid hydrocarbon oils, such as crude oil, reduced crude oil, gas oil, naphtha, etc., introduced through line 14, a sufficient amount of hot regenerated catalyst being used to vaporize the oil and raise it to conversion temperature.

In the catalytic cracking of hydrocarbons, any suitable cracking catalyst may be used as, for example, acid-treated bentonite clay, synthetic silica alumina gels, synthetic magnesia gels, etc. Preferably the catalyst used is in powdered form and has a size mainly finer than 100 standard mesh but coarser material may be used, if desired. Using acid-treated bentonite clay or synthetic silica alumina gel in powdered form, the density of the mixture shown at 28 in the drawing may vary between about 8 lbs./cu. ft. and 50 lbs./cu. ft., depending on the velocity of the vapors or gases passing upwardly through the fluidized mixture or bed 28. The velocity of the upflowing vapors or gases may range between about ½ ft./second and 5.0 ft./second but preferably between 1 and 1½ ft./second, the lower velocity giving higher densities in the bed or mixture 28.

Above the dense bed or mixture 28 is a dilute phase 34 in which the gaseous fluid or reaction products in vapor form contain only a small amount of entrained catalyst or contact particles. The gaseous fluid from the dilute phase 34 is passed through a separating means 36 arranged in the upper portion of the reaction vessel 10. The separating means is shown in the drawing as a cyclone separator but other forms of separating means may be used.

The separating means 36 separates most of the entrained catalyst or contact particles from the gaseous fluid passing upwardly in the reaction vessel 10. The separated catalyst or contact particles are returned to the dense fluidized bed or mixture 28 through line 38 which dips below the level 32 in the reaction vessel 10.

The separated gaseous fluid or vaporous reaction products leave the top of the reaction vessel 10 through line 42 after having passed through the separating means 36. The separated gaseous fluid or vaporous reaction products may be passed to any suitable equipment for recovering desired products. In the catalytic cracking of hydrocarbons the cracked vaporous products are preferably passed to a fractionating tower to separate a gasoline fraction from gases and higher boiling hydrocarbons.

During the catalytic cracking or conversion of hydrocarbons, the catalyst or contact particles become contaminated or spent by the deposition of coke or carbonaceous material on the particles. This carbonaceous or combustible material must be removed from the catalyst particles before they are used over again in another cracking or conversion operation. The contaminated or spent catalyst or contact particles are withdrawn from the bottom of the dense fluidized bed or mixture 28 and passed downwardly through an annular stripping or purging section generally indicated at 46.

The stripping or purging section is formed between the inner wall 47 of the reaction vessel 10 and a skirt or apron 48 which depends from the distribution plate 26. If desired, the bottom of the apron or skirt 48 may be closed in to eliminate any possibility of pockets forming between the feed cone inlet 22 and the skirt or apron 48. Stripping gas is introduced at a plurality of points in the bottom of the stripping zone or section as will be presently described.

The annular stripping zone is provided with a baffle construction, which in vertical cross-section simulates a disc and doughnut baffle construction, to increase the mixing between the stripping or purging gas and the downflowing spent or contaminated catalyst. By providing this baffle construction, the spent or contaminated catalyst is stripped or purged in a plurality of steps or stages. Other forms of solids-gas contacting means may be used.

The baffled construction in the annular stripping section or zone will now be described. As the stripping zone or section is annular, the elements of the baffle construction are also annular as will be seen from an inspection of Fig. 2. The inner portion of the top baffle is shown at 52 and comprises an inverted dished washer with the upper part thereof surrounding the apron or skirt 48 and supported by brace 50. The upper surface 56 of top baffle 52 forms a downwardly sloping face. The baffle 52 is arranged in the upper part of the stripping section 46.

The other portion of the top baffle is shown at 63 and from the drawing, it will be seen that it is similar in construction to the other portion of the baffle 52 just described. The baffle 63 is secured at its upper end to the inner wall of the reactor 10 and is supported by brace 64. The baffle 63 has a downwardly sloping surface 65. The baffles 63 and 52 are arranged at the same level and the lower edge 66 of baffle 52 and lower edge 67 of baffle 63 are spaced from each other to form a narrowed annular passageway 68 in the stripping section 46. As the dense fluidized mixture of spent or contaminated catalyst or contact particles to be stripped passes down through the narrowed passageway 68, there is increased agitation and a higher velocity of the stripping gas flowing upwardly at this point so that improved stripping is obtained.

Arranged below the passageway 68 of the baffle construction 52, 63 is an annular baffle 69 which is substantially angular in cross-section and has a pointed top 72 and downwardly diverging sides 73, 74. Baffle 69 is supported in any suitable manner. The top 72 of the annular baffle 69 is arranged directly beneath the narrowed passageway 68 above described so that the dense mixture passing downwardly is divided into two streams as it passes over the baffle 69. The bottom portion of the baffle 69 forms narrowed passageways 76 between the bottom edges 75 of the baffle 69 and the walls of the stripping section. Here again increased agitation and higher velocities of the stripping gas are obtained so that improved stripping is obtained.

Arranged below the baffle 69 is another baffle construction comprising annular elements 82 and 84 which are similar in construction to the baffle construction 52, 63 above described. The bottom edges of the baffles 82 and 84 form a narrowed passageway 86 therebetween. Arranged below the baffle construction 82, 84 is another baffle construction 88 which is similar to the baffle 69 above described. The baffle 88 functions in the same manner as the baffle 69 above described in that it subdivides the downflowing stream of contaminated or spent catalyst particles into two streams and more agitation and better stripping is obtained.

Arranged below the baffle 88 is another baffle construction 94, 96 which forms a narrowed passageway 98 between the bottom edges of the annular sections forming the baffle construction.

While there is specifically disclosed a certain number of disc and spaced annular substantially co-planar sets of baffle elements, it is to be understood that this is by way of example only and the number of elements may be changed as desired.

Stripping gas, such as steam, is introduced through line 102 having a valve 104 to an annular distributing line 106 provided with spaced nozzles 108 projecting into the lower portion of the stripping zone or section 46 for introducing the stripping gas at a plurality of points. As shown in the drawing, the nozzles 108 are arranged below the bottom baffle construction 94, 96. The stripping gas passes upwardly through the stripping zone or section 46 and the baffle construction functions to effect stripping in a plurality of stages. The catalyst or contact particles during stripping and during passage through the stripping zone or section 46 are maintained in a relatively dense fry fluidized liquid-simulating condition. The stripping gas and stripped out material passes from the top of the stripping section 46, through the dense bed 26 and into separating means 36.

The stripped or purged catalyst or contact particles flow downwardly from the stripping zone or section 46 into the bottom conical section 110 of the vessel 10 and accumulate as a dense fluidized mixture shown at 112. If desired, aerating gas may be introduced into the conical bottom 110 through line or lines 113. The stripped or purged catalyst or contact particles are then flowed into standpipe 114 only a portion of which is shown in the drawing.

Instead of using steam as a stripping gas, other inert gases, such as carbon dioxide, nitrogen, recycle hydrocarbon gas, hydrogen, normally gaseous hydrocarbons, etc., or mixtures thereof, may be used.

In the catalytic cracking of hydrocarbons where the oil feed is gas oil and the catalyst is a silica alumina catalyst, the temperature during the cracking in the reaction vessel 10 may vary between about 700° F. and 1100° F., but different temperatures may be used for other hydrocarbon conversion operations or other processes involving chemical reactions. The catalyst to oil ratio may vary between about 1 to one to 50 to one by weight.

The velocity of the stripping gas passing upwardly through the stripping zone or section 46 is so selected that the downflowing mixture is maintained in a relatively dense fluidized condition. While there may be portions of the fluidized mixture of lighter density, the average density of the fluidized mixture passing through the stripping zone when using silica alumina powdered catalyst may vary between about 5 lbs./cu. ft. and 40 lbs./cu. ft. The preferred velocity is about 1 ft./second to 2 ft./second.

In a series of tests on a stripper, the carry-over of non-stripped gases with the catalyst was decreased from about 12% to about 1% by the installation of the annular baffles above described, no other apparatus or operating changes being made.

In the commercial units the stripping section is about 8 ft. deep and the annulus 46 is about 3.5 ft. wide. In the commercial unit there are usually 3 sets of annular substantially co-planar baffles and 2 of the annular baffles 72 and 78.

Our invention is not to be limited to the particular annular baffle construction shown, as other solids-gas contacting apparatus may be used.

While our invention has been specifically described in connection with the catalytic cracking of hydrocarbons, it is to be understood that the invention is also useful in other operations where it is desired to remove a fixed gas or volatilizable material from spent or contaminated catalyst or from contact particles in other reactions, and this invention is not to be limited to the specific conditions nor to the specific process described, as these are given by way of illustration only and various changes and modifications may be made without departing from the spirit of the invention.

We claim:

1. An apparatus of the character described including a cylindrical vessel vertically arranged and adapted to contain a dense dry fluidized liquid-simulating mixture of contact particles and gaseous fluid, a centrally disposed horizontally arranged circular distribution perforated plate in the lower portion of said vessel, means for introducing gaseous fluid into said vessel for passage upwardly through said plate, a skirt depending from said plate and concentric with the wall of said vessel and forming an annular space therewith, means for introducing contact particles into said vessel, means for withdrawing gaseous fluid from the upper portion of said vessel, means for introducing a gaseous fluid into the lower portion of said annular space, baffle means in said annular space to provide a tortuous path through said space, said baffle means comprising several pairs of annular baffle members arranged in vertically spaced relation, each pair of annular baffles being so arranged as to deflect the contact particles to a single annular opening substantially centrally of said annular space and annular baffle members of angular cross-section arranged centrally of said annular space and substantially mid-way between each pair of annular baffle members and the next lower pair of annular baffle members said annular space communicating with the lower portion of said vessel above said plate whereby the dense fluidized particle mixture passes down into said space and over said baffle means and means for withdrawing stripped particles from the lower portion of said annular space.

2. An apparatus of the character described including a cylindrical vessel vertically arranged and adapted to contain a dense dry fluidized liquid-simulating mixture of contact particles and gaseous fluid, centrally disposed inlet means in the lower portion of said vessel, means for introducing gaseous fluid into said inlet means in said vessel for passage upwardly therethrough, a skirt depending from said inlet means and concentric with the wall of said vessel and forming an annular space therewith, means for introducing contact particles into said vessel, means for withdrawing gaseous fluid from the upper portion of said vessel, means for introducing a gaseous fluid into the lower portion of said annular space at a plurality of points spaced around said annular space, baffle means in said annular space, said baffle means comprising several pairs of annular baffle members arranged in vertically spaced relation, each pair of annular baffle members being so arranged as to deflect the contact particles to a singular annular opening substantially centrally of said annular space and annular baffle members of angular cross-section arranged centrally of said annular space and substantially mid-way between each pair of annular baffle members and the next lower pair of annular baffle members said annular space communicating with the lower portion of said vessel above said inlet means whereby the dense fluidized particle mixture passes down into said annular space and over said baffle means and means for withdrawing stripped particles from the lower portion of said annular space.

EDWIN J. GOHR.
HOMER Z. MARTIN.
CHARLES W. TYSON.

REFERENCES CITED

The following references are of record in the file of this patent:

UNITED STATES PATENTS

| Number | Name | Date |
|---|---|---|
| 1,265,298 | Bowman | May 7, 1918 |
| 1,513,622 | Manning | Oct. 28, 1924 |
| 1,936,866 | Van Ackeren | Nov. 28, 1933 |
| 2,270,903 | Rudbach | Jan. 27, 1942 |
| 2,304,128 | Thomas | Dec. 8, 1942 |
| 2,337,684 | Scheineman | Dec. 28, 1943 |
| 2,355,016 | Stein, Jr. | Aug. 1, 1944 |
| 2,358,888 | Thomas | Sept. 26, 1944 |
| 2,367,694 | Snuggs | Jan. 23, 1945 |
| 2,369,523 | Belchetz | Feb. 13, 1945 |
| 2,377,657 | Watts | June 5, 1945 |
| 2,384,932 | Lechthaler | Sept. 18, 1945 |
| 2,391,944 | Carlsmith | Jan. 1, 1946 |
| 2,398,228 | Hunt | Apr. 9, 1946 |